Patented June 26, 1923.

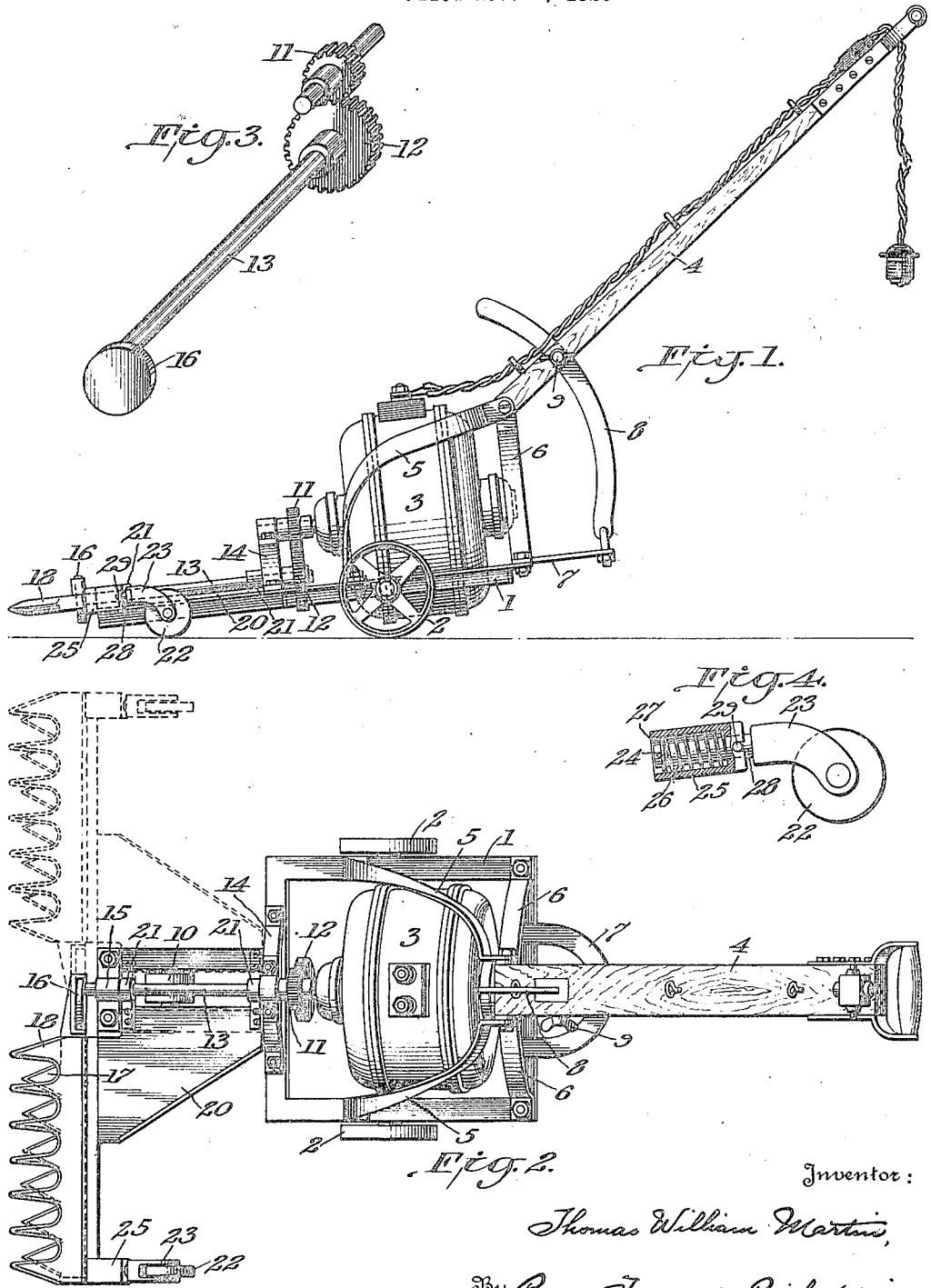

1,460,261

UNITED STATES PATENT OFFICE.

THOMAS W. MARTIN, OF HIBBING, MINNESOTA.

LAWN TRIMMER.

Application filed November 1, 1920. Serial No. 421,059.

*To all whom it may concern:*

Be it known that I, THOMAS WILLIAM MARTIN, a citizen of the United States, residing at Hibbing, in the county of St. Louis and State of Minnesota, have invented certain new and useful Improvements in Lawn Trimmers, of which the following is a specification:

The present invention relates to cutting machines of the type used for trimming lawns and hedges.

It is a general object of the invention to construct a machine of the type referred to adapted for universal application.

It is a more particular object to provide a machine which is particularly adapted for cutting grass or the like under overhanging objects relatively close to the ground.

Another and special object is also to provide a power-driven machine of the character mentioned which is simple in construction and operation, of light weight and cheap to manufacture.

For a full understanding of the invention reference is had to the accompanying drawings, in which—

Fig. 1 is a side view of a machine embodying the invention;

Fig. 2 is a plan view thereof;

Fig. 3 is a perspective view of some detail; and

Fig. 4 is an elevation of a detail, a part being broken away to show an enclosed element.

The device includes as principal elements a cutter mechanism, a motor, translating mechanism from the motor to the cutter mechanism and a carriage for moving the apparatus on the ground.

The elements just referred to are generally old and well known. What I claim as my invention is a particular arrangement of parts and some particular detail construction incident to such arrangement.

In the drawings 1 is a frame supported upon two wheels 2 and carrying the electric motor 3. At its rear end is pivotally supported a push bar 4 by means of a frame including straps 5 and 6, a rearwardly extending yoke 7 and a stay 8. The stay 8 is slidably adjustable through a slot in the bar 4 and may be secured in adjusted position by a screw 9. The particular form of support for the bar 4, however, is not material.

The frame 1 is extended forwardly to support the cutter mechanism and the translating mechanism and is itself supported by a roller 10. The motor shaft carries at its end a pinion 11 which meshes with a gear 12 at the end of the driven shaft 13. The motor shaft and the driven shaft 13 are journaled in a support 14. The forward end of the driven shaft 13 is supported by a bearing 15 and carries at its free end a cam 16.

The cutter mechanism comprises a toothed sickle blade 17 mounted for reciprocating motion in a toothed sickle guard 18. As previously stated this form of cutter is old and well known. The sickle guard 18 is connected to a brace 20 which is pivotally connected, as by straps 21 to the shaft 13 so that the cutter may be swung about the shaft 13 as a center. The cutter is disposed wholly on one side of the shaft and the free end of the guard 18 is supported by a roller 22 of the same diameter as roller 10. The inner end of the sickle blade 17 is slotted to receive the cam 16. Thus when the shaft 13 revolves, the sickle blade is reciprocated by the cam 16.

As indicated in dotted lines in Fig. 1, the cutter may be turned through an angle 180° so as to assume an operative position on either side of the shaft 13. The roller 22 is pivoted on a curved forked arm 23 which has a shank 24 extending into a cylindrical casing 25. In the casing 25 is a spring 26 which bears at one end against a collar 27 secured to the end of the shank and at its other end against the wall of the casing through which the shank passes. Thus the shank is normally held in the casing and may be moved outwardly against the tension of the spring 27. In the outer face of the casing I have provided a groove 28 to receive a pin 29 on the shank 24. This arrangement permits the roller to be held in positions 180° apart so that the cutter may be properly supported in either of its operative positions.

The operation of the apparatus is obvious. The cutter mechanism may be disposed to cut along a hedge at the right or at the left or under overhanging objects of any sort. By making the apparatus of sufficiently light weight it may be used for trimming the top of a hedge. The blades may be held in a vertical position to trim the sides of a hedge. In addition the apparatus may, of course, be used as a common lawn mower.

It should be noted that the rollers 10 and 22 are considerably smaller than the wheels 2 so that the cutter blade may be normally operated close to the ground and yet easily raised by means of the bar 4 to cut at greater distances from the ground, as desired.

In the foregoing I have shown only one form in which the invention may be carried out. It is obvious, however, that various changes may be made both as to the details of construction and as to the arrangement of parts within the scope of the disclosure.

I claim:

1. An apparatus for trimming hedges and mowing lawns, comprising a wheeled support, a shaft disposed in the direction of movement of the support, a sickle blade and guard therefor disposed at right angle to the shaft and mounted for pivotal movement about the same as center so as to occupy either one of two positions in the same horizontal plane on opposite sides of the shaft or any intermediate position and means constructed and arranged for translating the rotary motion of the shaft into reciprocating motion of the sickle blade in all angular positions of the blade relatively to the shaft.

2. An apparatus for trimming hedges and mowing lawns, comprising a wheeled support, a shaft disposed in the direction of movement of the support, a sickle blade and guard therefor disposed at right angle to the shaft and a cam disk at the front end of the shaft, a part of the blade having an opening encompassing the cam disk.

3. An apparatus for trimming hedges and mowing lawns, comprising a wheeled support having a portion extending centrally forwardly from the main support, a shaft mounted on said portion in the direction of movement, a cam disk at the free front end of the shaft, a sickle guard pivotally mounted on the shaft and a sickle blade having a part encompassing the cam disk.

4. An apparatus for trimming hedges and mowing lawns, comprising a wheeled support having a portion extending centrally forwardly from the main support, a shaft mounted on said portion in the direction of movement, a cam disk at the free front end of the shaft, a frame pivotally mounted on the shaft and carrying at its front end a sickle guard disposed at right angle to the shaft and in the plane of the cam disk, and a sickle blade having a part encompassing the cam disk.

5. An apparatus for trimming hedges and mowing lawns, comprising a shaft and a rolling support therefor, a cam at the end of the shaft, a sickle blade having at one end a slot for receiving the cam, a sickle guard and means connected therewith for supporting the guard for pivotal motion through an angle of 180 degrees about the shaft and a roller at the free end of the guard, and means for changing the position of the roller in vertical direction.

6. An apparatus for trimming hedges and mowing lawns, comprising a cutter mechanism pivotally supported at one end and adapted to assume an operative position on either side of the pivotal support, a rolling support for the pivoted end of the cutter mechanism, a roller for supporting the free end of the said mechanism and means for changing the position of the roller in vertical direction.

In testimony whereof, I affix my signature.

THOMAS W. MARTIN.